United States Patent

Fergusson

[11] Patent Number: 6,033,153
[45] Date of Patent: Mar. 7, 2000

[54] ROCK BOLT AND METHOD OF INSTALLING A ROCK BOLT

[75] Inventor: Jeffrey Robert Fergusson, Glenorie, Australia

[73] Assignee: Industrial Rollformers Pty. Limited, Smithfield, NSW, Australia

[21] Appl. No.: 08/776,989

[22] PCT Filed: Aug. 30, 1995

[86] PCT No.: PCT/AU95/00554

§ 371 Date: Feb. 18, 1997

§ 102(e) Date: Feb. 18, 1997

[87] PCT Pub. No.: WO96/07015

PCT Pub. Date: Mar. 7, 1996

[30] Foreign Application Priority Data

Aug. 30, 1994 [AU] Australia ................................ 7763

[51] Int. Cl.$^7$ .................................................. E21D 21/00
[52] U.S. Cl. ..................................... 405/259.6; 405/259.1
[58] Field of Search ................................ 405/259.1, 259.2, 405/259.3, 259.4, 259.5, 259.6; 470/8, 9, 10, 11, 12, 14

[56] References Cited

U.S. PATENT DOCUMENTS

| | | | |
|---|---|---|---|
| 3,108,443 | 10/1963 | Schuermann et al. | 405/259.6 |
| 3,641,772 | 2/1972 | Dietrich | 405/259.5 |
| 3,797,254 | 3/1974 | Askey et al. | 405/259.3 |
| 4,127,000 | 11/1978 | Montgomery, Jr. et al. | 405/261 |
| 4,343,399 | 8/1982 | Patel et al. | 405/259.6 |
| 4,430,025 | 2/1984 | Ciavatta | 405/259.6 |
| 4,432,682 | 2/1984 | McKewan | 411/311 |
| 4,564,315 | 1/1986 | Rozanc | 405/261 |
| 4,652,194 | 3/1987 | Tajima et al. | 411/417 |
| 4,744,699 | 5/1988 | Price et al. | 405/259.5 |
| 4,820,095 | 4/1989 | Mraz | 405/259.6 |
| 4,850,746 | 7/1989 | Finsterwalder et al. | 405/260 |
| 5,387,060 | 2/1995 | Locotos | 405/259.6 |
| 5,562,377 | 10/1996 | Giannuzzi et al. | 405/259.6 |

FOREIGN PATENT DOCUMENTS

| | | | |
|---|---|---|---|
| A-38991/85 | 5/1985 | Australia | E21D 20/02 |
| A-25046/88 | 5/1989 | Australia | F16B 19/14 |
| 2500053 | 8/1982 | France | 405/259.6 |
| 1902045 | 8/1970 | Germany | 405/259.6 |
| 28 43 038 | 4/1980 | Germany | E21D 21/00 |
| 41 26 539 A1 | 2/1993 | Germany | F16B 23/00 |
| 2172682 | 9/1986 | United Kingdom | E21D 20/00 |
| 2206172 | 12/1988 | United Kingdom | E21D 20/02 |
| 2211259 | 6/1989 | United Kingdom | F16B 31/00 |
| 2211260 | 6/1989 | United Kingdom | F16B 31/02 |

*Primary Examiner*—William Neuder
*Assistant Examiner*—Frederick Lagman
*Attorney, Agent, or Firm*—Limbach & Limbach L.L.P.

[57] ABSTRACT

The invention relates to a rock bolt (1) and method of installing a rock bolt, particularly a hollow bolt. The method of installation utilises a chemical anchor, the components of which are provided in a cartridge (4) which is either injected through the bolt or removably attached to an end thereof. The bolt preferably includes a thread (40) formed by plastically deforming the walls (41) of the bolt so as to maximise tensile strength whilst minimising wall thickness.

9 Claims, 6 Drawing Sheets

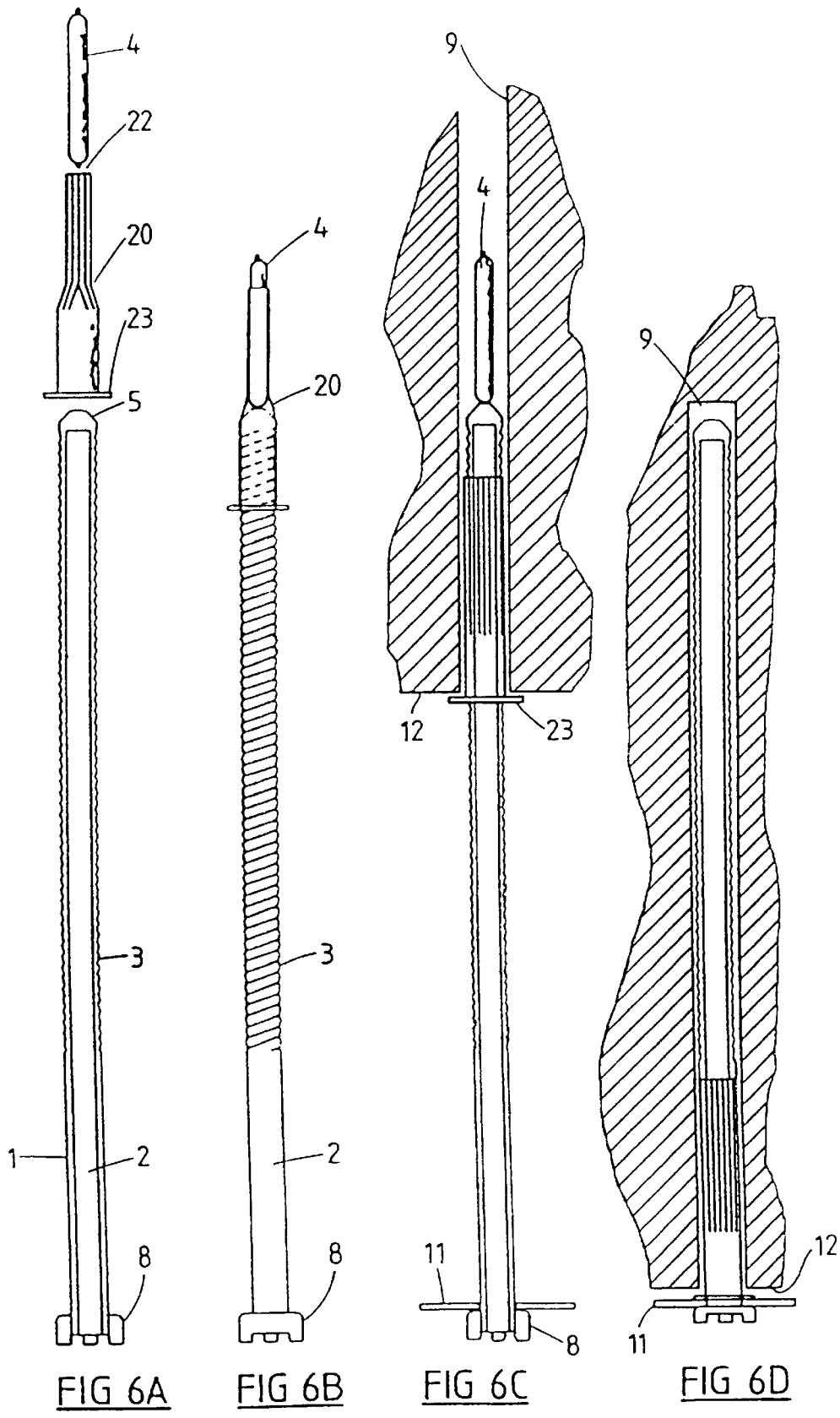

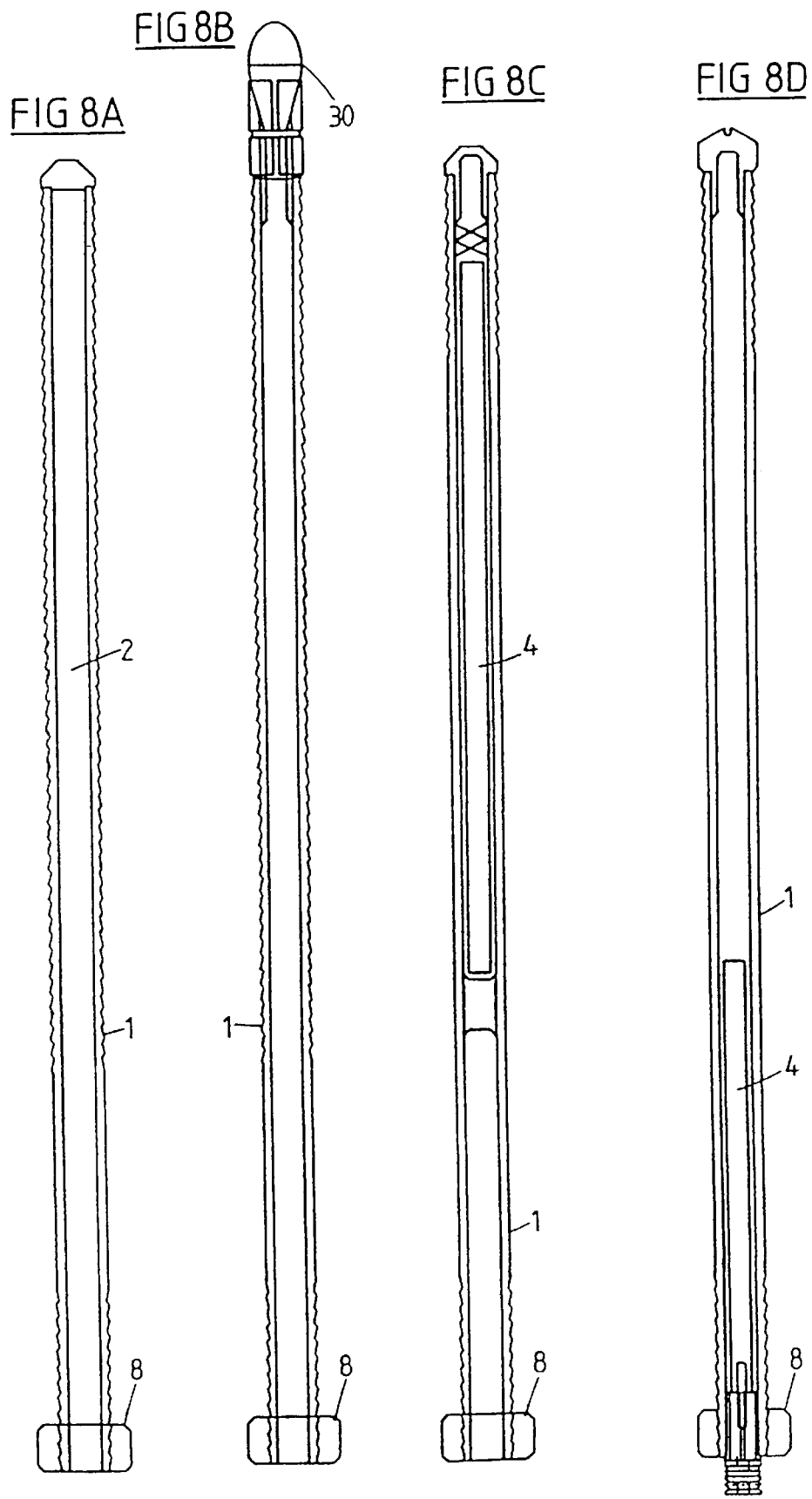

ROCK BOLT AND METHOD OF INSTALLING A ROCK BOLT

The present invention relates to rock bolts and methods of installation of rock bolts.

A form of rock bolt is known in the mining industry which is used for increasing the strength of a wall or roof of a mine. The bolt is formed of a solid steel rod having a diameter in the order of 22 millimeters and a nut threadably fitted to one end thereof. In use, the bolt is secured in a 27 millimeter diameter hole formed in the rock strata by means of a chemical anchor in the form of a resin and when so secured the nut is screwed along the bolt to draw the strata together and thereby increase the tensile strength of a portion of the wall in which the bolt is secured. The method of installing the bolt includes drilling a hole in the rock wall, manually inserting a cartridge containing chemical (resin) components in the hole, inserting the bolt in the hole to rupture the cartridge and rotating the bolt so as to mix the components to form the chemical (resin) anchor. Such a method does, however, have a number of disadvantages, one of which is that difficulties are experienced in preventing the cartridge from sliding back out of the hole before the bolt is inserted therein.

In accordance with the present invention there is provided a method of installing a bolt comprising:

removably attaching a cartridge containing chemical components to an end of the bolt; inserting the bolt in a hole in a rock face;

rupturing the cartridge;

rotating the bolt to mix the chemical components together and transport the mixed chemical along the length of the bolt.

Preferably the cartridge is removably attached to the bolt by means of a plastically deformable sleeve that is fitted over the cartridge and the end of the bolt.

Preferably the sleeve is provided with an outwardly extending flange at the end thereof fitted over the bolt and the flange is caused to engage the rock face at the opening of the hole such that insertion of the bolt into the hole forces the bolt through the sleeve to drive the cartridge into the remainder of the hole.

In another aspect, there is provided a bolt having a deformable sleeve fitted thereto, the sleeve carrying a cartridge containing chemical components in an open end thereof Preferably, the sleeve has a flange extending outwardly from the end of the sleeve fitted to the bolt such that insertion of the bolt into a hole in a rock face causes the flange to engage the rock face at the opening of the hole such that further insertion of the bolt into the hole results in the bolt passing through the sleeve and carrying the cartridge into the remainder of the hole.

Preferably the flange forms a metal plate for engagement with a securing nut of the bolt.

Preferably the bolt is hollow such that the reduced amount of material used in construction of the hollow bolt, as compared to a solid bolt, will lead to some cost advantage. However, the nature of a chemical anchor which is preferably a resin anchor requires that the diameter of the bolt must be only slightly smaller than that of the hole in which it is inserted, say in the order of four millimeters whereby to provide a two millimeter angular gap therebetween, and in the case of hard rock mining the holes are in the order of 50% larger in diameter than the holes used in coal mining. This increased size is a function of the drilling machinery used in hard rock mines itself being larger than that used in coal mines. Chemical anchors are, therefore, clearly not suitable for use with such diameter bolts when the spacing between the bolt and the walls of the hole would be too great for a chemical anchor to be effective.

Due to the increased diameter holes a different method of installing rock bolts is generally practiced. This involves attachment of an expandable "shell" to an end of a bolt forming a mechanical anchor, inserting the bolt into a hole, whereby once fully inserted the shell is expanded to grip the walls of the hole and thereby locate the bolt, and injecting cementacious grout into the annular region between the bolt and the walls of the hole.

It would, of course, be possible to utilise a chemical anchor in hard rock mining if a bolt of sufficiently large diameter was employed. The cost of producing a solid bolt of such diameter would, however, tend to be prohibitive such as for example a 41 millimeter diameter solid bolt for use in a 45 millimeter diameter hole. A hollow bolt would incur less material cost but would not have significant cost advantage unless the wall thickness of the hollow bolt was relatively thin, to minimise the amount of material used in the bolt. A bolt of this type would, however, have reduced load bearing characteristics and some additional structure would be required to provide sufficient strength to the bolt. Accordingly, the bolt used in the present invention also preferably has some form of deformations along its length, in the form of a thread, whereby to increase the stiffness of the bolt and increase the bonding effectiveness of the chemical anchor. However, formation of the thread by a conventional cutting, rolling or milling technique would further reduce the wall thickness of the bolt in the troughs of the thread and thereby lead to a decrease in the tensile strength of the bolt.

In accordance with another aspect, the present invention provides a method of forming a thread on a tubular bolt comprising exerting an inwardly directed force relative to the bolt whereby to plastically inwardly deform a portion of a wall of the bolt whilst substantially maintaining the wall thickness along the length of the thread, the force being exerted at an angle to the normal of the bolt such that one of the flanks of the threads is inclined toward the normal to a substantially greater extent than the other flank. Such a method of forming the thread has the advantage of retaining the wall thickness of the tube therefore retaining tensile strength. Actual tests have shown an increase in tensile strength. In addition a thread has the advantage that a corresponding thread is formed on the interior of the bolt whereby various fittings such as expandable shells, or drill bits may be mounted to the end of the bolt by being screwed on to the internal threading. Another advantage is that the flank that is angled toward the normal provides a surface which can be loaded with compressive force of the rock strata, thereby increasing the in-situ loading characteristics of the bolt. The overall strength of the bolt is also not adversely affected since the wall thickness of the bolt is maintained. However, a transverse cutting force exerted by, for example, a long wall miner will be able to cut through the bolt in a transverse direction relatively easily, as opposed to a solid bolt of the same dimensions.

In accordance with another aspect, there is provided a bolt having a thread formed in accordance with the above-described method. Preferably the bolt has a drill bit fitted to an end thereof.

Also, in hard rock mining tensioning of the bolt is generally not required and all that is done after a bolt has been anchored in a rock face is to secure a roof plate or the like to the rock face by means of securing a nut along thread formed on the end of a bolt. Such a two step process of fixing the bolt and securing the roof plate can, however, be achieved in a single step by having the nut fixedly secured to the bolt and driving the bolt into the rock to its maximum extent.

It will be appreciated that a number of different inventive concepts have been described above in relation to rock bolts but that a number of such concepts may be embodied in a single bolt formed in accordance with the present invention—or parts of the invention embodied in a single bolt depending on the requirements of the application for the rock bolts use.

Preferred embodiments of the invention will hereinafter be described with reference to the accompanying drawings in which:

FIGS. 6A to 6D show a form of rock bolt according to the present invention and a method of installation thereof.

FIG. 8A shows a rock bolt according to a form of the present invention and FIGS. 8B to 8D show various applications of that rock bolt;

Figure 1:
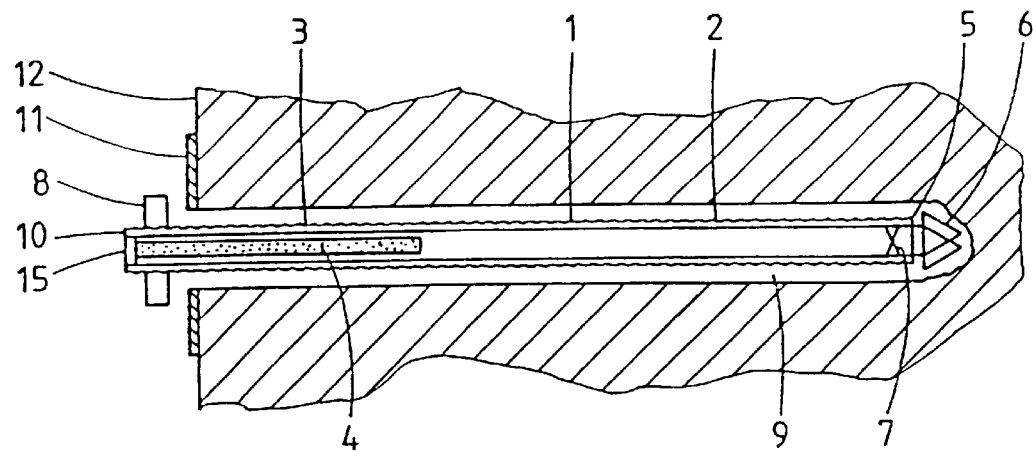
FIG. 1 is a schematic cross-sectional side view of a hollow rock bolt.
Figure 2:
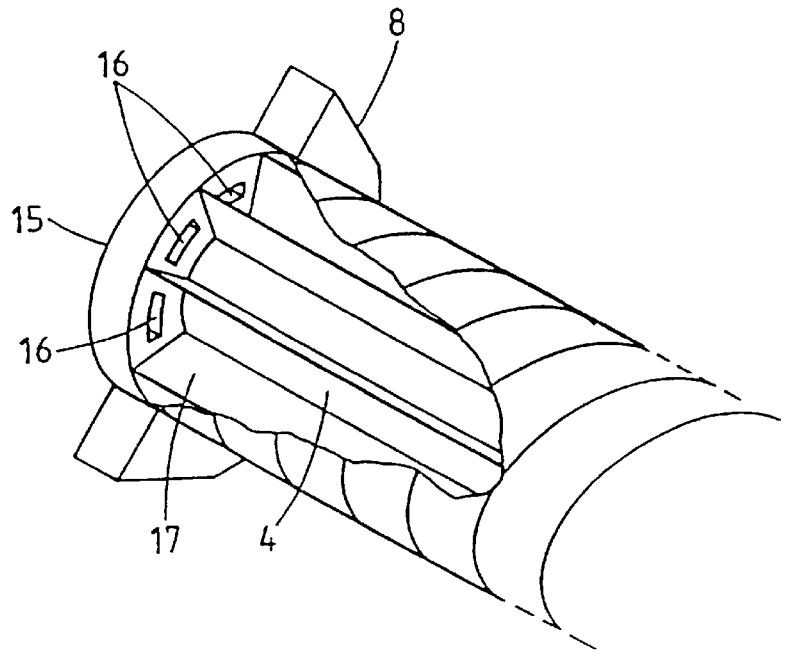
FIG. 2 is a partially cut-away view of the rock bolt shown in FIG. 1.
Figure 3:
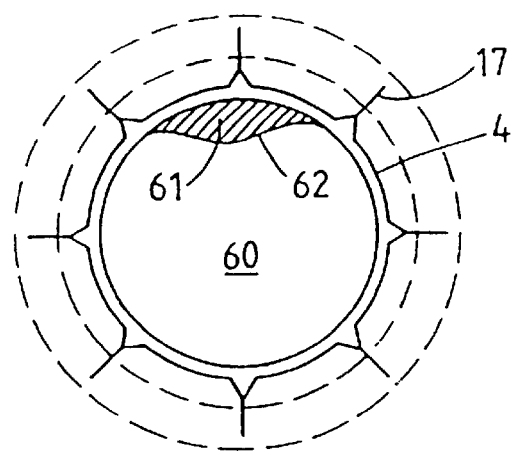
FIG. 3 is a cross-sectional view of the cartridge portion of the rock bolt shown in FIGS. 1 and 2.

The rock bolt 1, as shown in FIG. 1, comprises a hollow shaft 2 with thread 3 formed on an exterior surface thereof and a cartridge 4 provided therewithin. The bolt may have an open front end 5 but is shown by way of example as having a drill bit 6 secured thereto. In operation, the front end 5 is inserted in a hole formed in a rock face and the cartridge 4 injected through the hollow shaft 2 with a syringe action from pressure on the plunger into the hole 9. Prior to exiting the bolt I the resin may be mixed by cross-wires 7, or alternatively, mixing of the resin may occur after exiting the bolt 1. As shown in FIG. 3 the cartridge contains a resin 60 and a catalyst 61 separated by a membrane 62. The bolt is then rotated whereby to mix the chemical (resin) components of the ruptured cartridge and to simultaneously work the components along the length of the bolt 1, toward the opening of the hole. Alternatively, a sufficiently large amount of chemical compounds may be forced into the hole 9 from the bolt such that additional spinning of the bolt is not required.

After the chemical anchor has set, a nut 8 may be screwed along the free end 10 of the bolt to secure a load bearing plate 1 against the rock face 12.

The chemical cartridge 4 is preferably forced along the bolt 1 by means of a plunger 15 which preferably has circumferentially arranged axially extended openings 16 formed therein to allow passage of water through the bolt 1 for lubrication of drill bit 6 during a drilling operation. The holes 16 may, however, be sealed such that the plunger is forced by way of hydraulic pressure along the inside of the cartridge 4, thereby forcing the resin from the bolt 1. The cartridge is also preferably formed with lengthwise extending splines 17 which serve to hold the cartridge 4 in a generally central position with respect to the shaft 2 whilst also allowing liquid from opening 16 to pass therearound.

Figure 4:
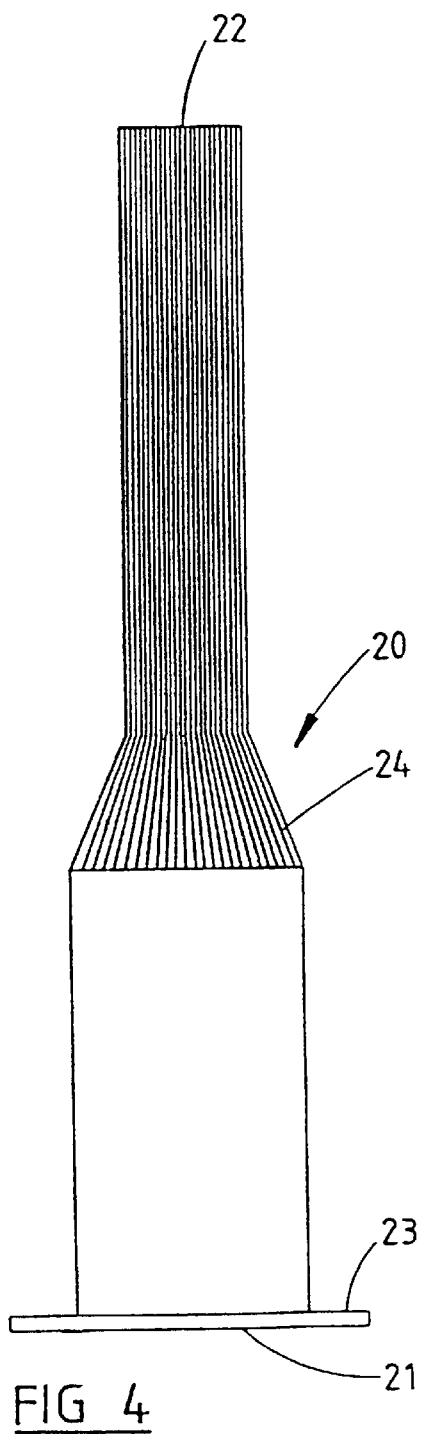
FIG. 4 is a side elevation of the cartridge sleeve of a cartridge for use with the form of rock bolt shown in FIGS. 6A to 6D.
Figure 5:
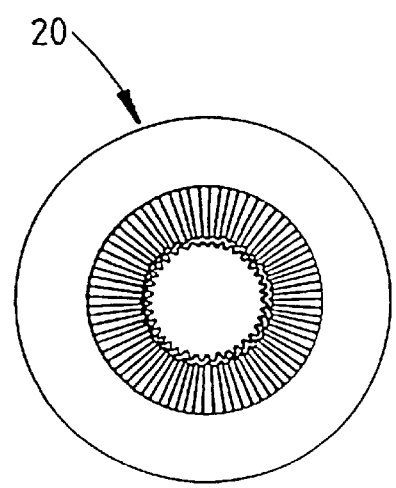
FIG. 5 is an end elevation of the cartridge sleeve shown in FIG. 4.

As an alternative to the abovedescribed bolt, the cartridge 4 may instead be removably attached to the front end of the bolt by means of a sleeve 20, as shown in FIGS. 6A to 6D. Details of the sleeve are shown in FIGS. 4 and 5. The sleeve 20 is formed of a resilient material which allows one end 21 thereof to be fitted on an end of the bolt and has an open end 22 for receiving and holding the cartridge 4. The sleeve is concertinaed with the ribs 24 running parallel with the axis of the tubular bolt thereby allowing the sleeve to expand to the diameter of the bolt when expanded and hold the smaller diameter cartridge when contracted. The sleeve 20 also preferably has a flange 23 which is adapted to engage the rock face 12 when the bolt is inserted in hole 9 such that further insertion of the bolt causes the bolt to pass through the sleeve 20 whereby the cartridge is carried forward by the front end of the bolt. The sleeve 20 and flange 23 are preferably formed of plastic whereby to protect the portion of the bolt adjacent the opening of the hole from water-damage and corrosion. Preferably the flange 23 is in the form of a conventional plate against which nut 8 may be engaged.

Figure 7C:
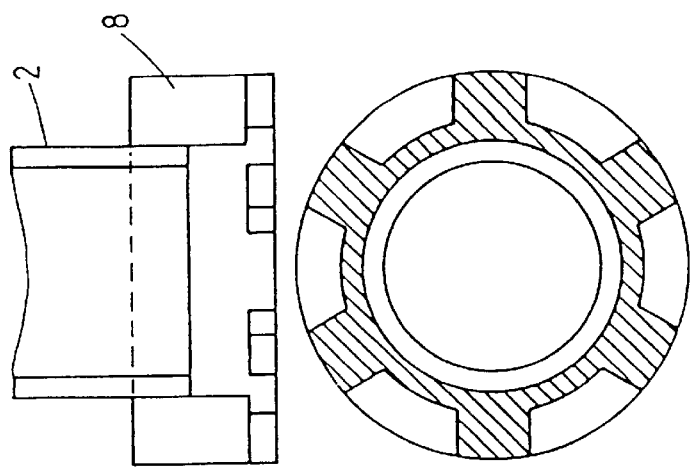
FIG. 7C shows a plan and sectional side elevation of the rock bolt shown in FIG. 9.
Figure 7B:
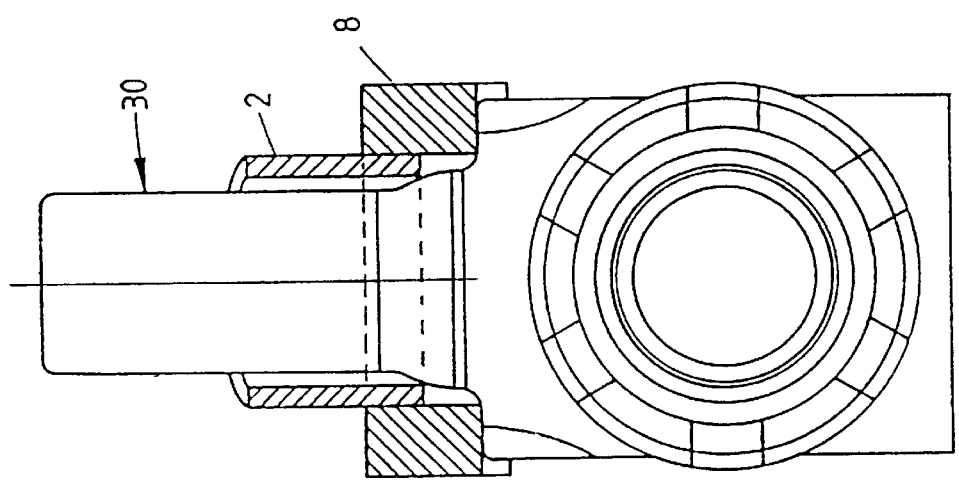
FIG. 7B shows the driver tool of FIG. 7A in the coupled position with a rock bolt.
Figure 7A:
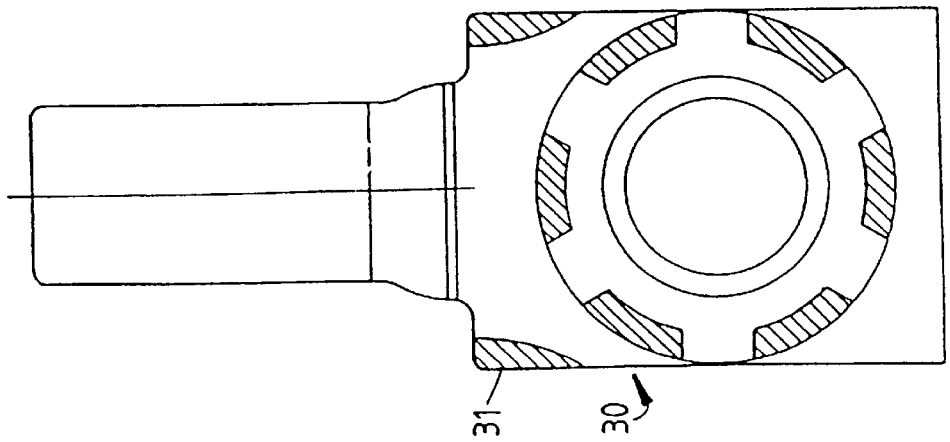
FIG. 7A shows a side elevation with superimposed end elevations of drive members suitable for use in the installation of rock bolts according to the present invention.
Figure 9:
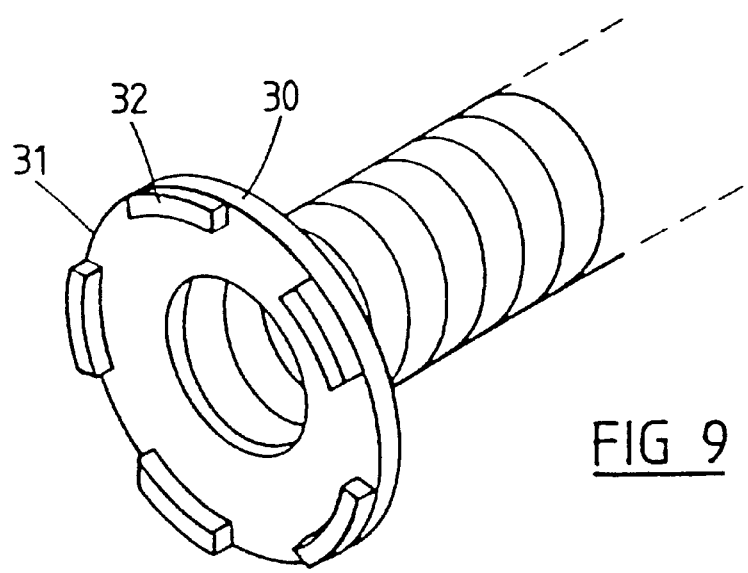
FIG. 9 is a schematic view of an end portion of a form of rock bolt according to the present invention and FIG. 10 is a schematic sectional side elevation of a form of rock bolt according to the invention.

Either of the abovedescribed bolts may have the nut 8 formed integrally with the bolt 1, such as by welding or the like. This is particularly advantageous in hard rock mining wherein tensioning is generally not required and the only function to be served by the nut is that of securing the plate 11 to the rock face 12. In this regard, a driving member 30 type of which are shown in FIG. 7A may be employed. Such a member 30 comprises a ring 31 welded to the end of bolt 1 and provided with bosses 32 which engage in corresponding recesses of a driving mechanism (not shown) which is used for inserting and spinning the bolt 1 in hole 9. The form of the member 30 is particularly advantageous in that the material used can be significantly less than a conventional nut.

Figure 10:
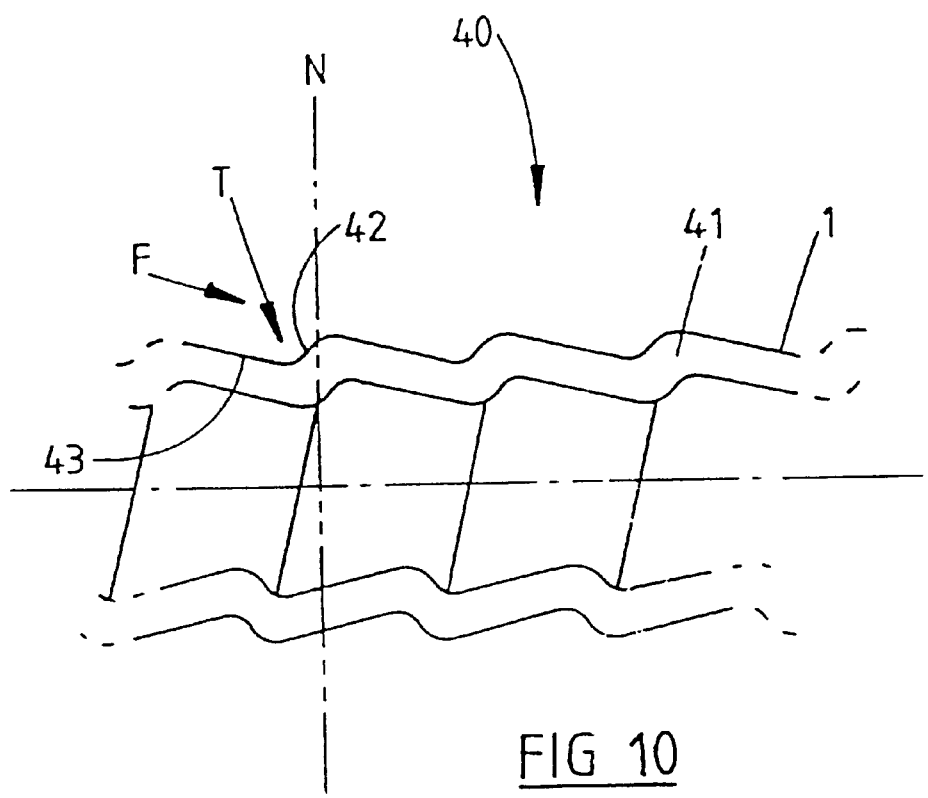

When using a hollow bolt in hard rock mining, the wall thickness of the bolt must be such as to maintain the strength of the bolt whilst also keeping material costs at a minimum. In order to achieve an optimal minimal wall thickness, the present invention provides a thread as illustrated in FIG. 10. Such a thread 40 is formed by plastically deforming the walls 41 of bolt 1 in a manner whereby the actual wall thickness of the bolt itself is maintained. This is achieved by applying a force in the direction indicated by the arrow marked "T" that is angled away from the normal "N" such that two generally perpendicular flank surfaces 42 and 43 are produced. This is done as the pitch of the thread is decreased while leading into the rolls and having the helix angle of the rolls at a ratio of pitch change to move the material inwards and in the direction of F without stretching and skimming the wall which results in the same diameter as the feed stock. The rolls, unlike conventional designs, are individually profiled to achieve a constant flow of material reducing stress. Surface 42 is substantially normal to the axis of bolt 1 and is thereby exposed to carry a greater force F than is possible with a conventional V-shaped thread. Also, maintaining the wall thickness means that the overall tensile strength of the bolt 1 is increased in comparison with a bolt having the same initial dimensions but formed with a conventional thread which reduces the wall thickness.

FIGS. 8A to 8D show various rock bolts I with a thread as described above being used in various applications. FIG. 8A shows the standard rock bolt 1 with threaded section 3 and nut 8. FIG. 8B shows the rock bolt 1 having a mechanical anchor 30 attached to the end thereof. FIG. 8C shows the rock bolt similar to the arrangement shown in FIG. 1. FIG. 8D is a further variation.

As will be appreciated from the above, the diameter of the bolt hole used in hard rock mining is too great to justify material costs of chemically anchoring solid bolts with an optional resin annulus of 2 mm, the larger the annulus the poorer the mixing of the resin and the weaker the holding capacity of the bolt. The thread as described above, however, overcomes these problems to some extent at least by allowing for the bolt to have a reduced wall thickness of, for example, 4 mm (with say an 8 mm pitch) in a bolt of about 34 mm diameter, whilst maintaining a suitable tensile strength. A standard solid bolt of 21.7 mm diameter 2000 mm long, grade 250 Mpa, resin anchored in a 27 mm diameter hole uses 0.4 liters of resin and a UTS of 18 tonnes. A standard solid bolt of 21.7 diameter 2000 mm long, grade 250 Mpa, resin anchored in a 45 mm diameter hole uses 2.4 liters of resin and a resin failure of 12 tonnes. A hollow bolt of 41 mm diameter, 4 mm wall, 2000 mm long, grade 250 Mpa, resin anchored in a 45 mm diameter hole uses 0.54 liters of resin and a UTS of 22 tonnes. The process of chemically anchoring rock bolts is, therefore, more economically viable for hard rock mining techniques using the present invention than has previously been the case. Also, the thread formed as described above provides a bolt with an internal thread that is suitable for mounting a number of different devices, such as drill bits etc.

Also, the injection of chemical through the bolt, or attaching the chemical to an end of the bolt as described above, increases the ease by which a bolt may be secured using a chemical anchor and increases the overall speed at which installation can be achieved compared with previous grouting techniques.

The installation of one of the abovedescribed bolts can also be further simplified by having the drive member, described with reference to FIG. 7A, formed integrally with the bolt.

Many modifications and variations may be made to the abovedescribed bolts and method of installing the bolts without departing from the spirit and scope of the invention.

I claim:

1. A method of installing a bolt comprising:
   removably attaching a cartridge containing chemical components to an end of the bolt,
   inserting the bolt in a hole in a rock face;
   rupturing the cartridge;
   rotating the bolt to mix the chemical components together and transport the mixed chemical along the length of the bolt,
   wherein the cartridge is removably attached to the bolt by means of a plastically deformable sleeve that is fitted over the cartridge and the end of the bolt,
   wherein the sleeve is provided with an outwardly extending flange at the end thereof fitted over the bolt and the flange is caused to engage the rock face at the opening of the hole such that insertion of the bolt into the hole forces the bolt through the sleeve to drive the cartridge into the remainder of the hole.

2. A bolt having a deformable sleeve fitted thereto, the sleeve being adapted to carry a cartridge containing chemical components in an open end thereof, wherein the sleeve includes a flange extending outwardly from the end of the sleeve fitted to the bolt such that insertion of the bolt into a hole in a rock face causes the flange to engage the rock face at the opening of the hole such that further insertion of the bolt into the hole results in the bolt passing through the sleeve to carry the cartridge into the remainder of the hole.

3. A bolt as claimed in claim 2, wherein the flange is in the form of a plate for engagement with a securing nut of the bolt.

4. A bolt having a deformable sleeve fitted thereto, the sleeve being adapted to carry a cartridge containing chemical components in an open end thereof, wherein the bolt includes a hollow portion having a thread provided therealong, the thread being formed in accordance with a method comprising exerting an inwardly directed force relative to the bolt whereby to plastically inwardly deform a portion of a wall of the bolt whilst substantially maintaining the wall thickness along the length of the thread, the force being exerted at an angle to the normal of the bolt such that one of the flanks of the thread is inclined toward the normal to a substantially greater extent than the other flank.

5. A bolt having a deformable sleeve fitted thereto, the sleeve being adapted to carry a cartridge containing chemical components in an open end thereof, wherein the bolt is hollow and comprises a thread formed by exerting an inwardly directed force relative to the bolt whereby to plastically inwardly deform a portion of a wall of the bolt whilst substantially maintaining the wall thickness along the length of the thread, the force being exerted at an angle to the normal of the bolt such that one of the flanks of the thread is inclined toward the normal to a substantially greater extent than the other flank.

6. A rock bolt for use with a chemical anchor, the bolt having an elongate, generally cylindrical shaft defining a hollow interior with a closed front end and side wall,
   wherein a free end of the bolt includes a drive member fixed thereto to facilitate rotation of the bolt via a driving mechanism adapted to couple thereto,
   wherein the drive member is in the form of a castellated ring, having circumferentially space bosses to engage corresponding recesses of the driving mechanism.

7. A rock bolt for use with a chemical anchor, the bolt having an elongate, generally cylindrical shaft defining a hollow interior with a closed front end and side wall,
   wherein the bolt has a deformable sleeve fitted thereto, the sleeve being adapted to carry a cartridge containing chemical components in an open end thereof,
   wherein the sleeve includes a flange extending outwardly from the end of the sleeve fitted to the bolt such that insertion of the bolt into a hole in a rock face causes the flange to engage the rock face at the opening of the hole such that further insertion of the bolt into the hole results in the bolt passing through the sleeve to carry the cartridge into the remainder of the hole.

8. A bolt as claimed in claim 7, wherein the flange is in the form of a load bearing plate.

9. A rock bolt as claimed in claims 6, 7 or 8 including a thread provided therealong, the thread being formed by exerting an inwardly directed force relative to the bolt whereby to plastically inwardly deform a portion of the wall of the bolt, the force being exerted at an angle to the normal of the bolt such that one of the flanks of the thread is inclined toward the normal to a substantially greater extent than the other flank.

* * * * *